July 6, 1971 R. A. OPPERMANN 3,591,455
CONTINUOUS MICROBIAL PROCESS
Filed Feb. 14, 1968
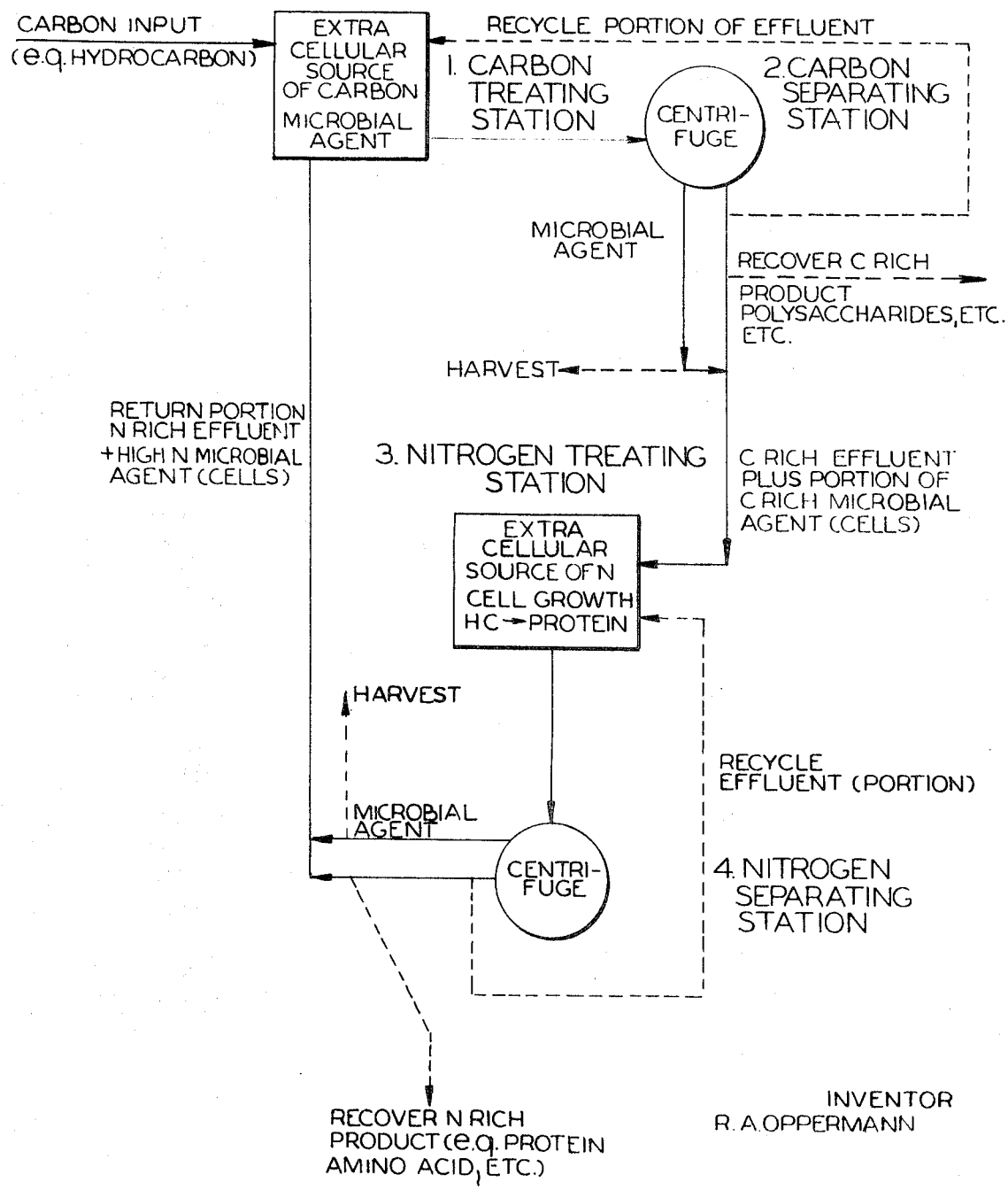
INVENTOR
R. A. OPPERMANN
Marzall, Johnson, Cook and Root
ATTORNEY United States Patent Office 3,591,455
Patented July 6, 1971

3,591,455
CONTINUOUS MICROBIAL PROCESS
Robert A. Oppermann, Oak Lawn, Ill., assignor to
Nalco Chemical Company, Chicago, Ill.
Filed Feb. 14, 1968, Ser. No. 705,550
Int. Cl. C12b 1/00
U.S. Cl. 195—28        10 Claims

ABSTRACT OF THE DISCLOSURE

The present invention broadly comprises a process for the utilization of a source of carbon and a separate source of nitrogen in a continuous system wherein by varying the choice of input carbon source and a selected initial batch of microbial agent, oxygenated or reduced hydrocarbon products are formed where the microbial agent is operated under non-proliferating conditions. The invention further contemplates the production of proteins and amino acids at the source of nitrogen where extra cellular nitrogen is provided under nitrogen-supplemental conditions, such as by an inorganic compound like ammonium sulfate. The system is continuous and carefully regulated so that even though carbohydrate product is desired from the source of carbon, a portion of the stream and the microbial particles are passed through the process to the source of nitrogen in a growth cycle before returning to the input source of carbon. After both primary treatment stations in the process centrifuges separate the microbial agent from the medium, the desired commercial product may be further separated and recovered from said stream where optionally the preceding treatment station is live, i.e. where C or N cells are harvested and optionally commercially products are produced. After each live separating station, the total microbial agent is split; a major portion is harvested and the remainder is passed along to the subsequent treating station of the opposite source (i.e., C or N). A portion of the effluent containing the medium is preferably recycled where the station is live and in a minority of cases a portion of the microbial agent may be recycled to provide inoculum.

In the field of the present invention, the prior art is cited: 3,057,784, Davis et al.; 3,308,035; Douros; 3,340,155, Douros et al.

Davis et al. '784 and Douros et al. '155 above, teach oxidation of hydrocarbons by microbiological means, whereas Douros '035 above teaches the production of a high protein composition by microbial treatment by hydrocarbons.

None of these references disclose or suggest the novel continuous and product variable process of the present invention, nor do they suggest the division or split of the microbial agent with recycling of a portion of the effluent to the preceding treatment station and the provision of separate C and N treatment stations where are produced respectively C or N rich cells and optionally extra cellular commercial products.

DESCRIPTION OF THE DRAWING OR DIAGRAM

FIG. 1 is a block diagram teaching the major aspects of the present invention, reading from left to right, carbon input, for example hydrocarbon, flows into 1 which is the carbon treating station containing a micrboial agent selected to effectively introduce the desired results such as reduction or oxidation of hydrocarbon. As a start up, an initial or seed portion or bath of the microbial agent is prepared and placed in 1. After this initial portion, in most cases due to features later explained, the microbial agent is sustained by continuous return for the nitrogen treating station 3. Treating station 1 may be of a bed or tank containing agitation and oxygen input means, as for example, in FIG. 2 of 3,251,749 Lipp.

The effluent from 1 passes to centrifuge 2 which may preferably be either of the dry bowl type or liquid-liquid centrifuge. A convenient bowl type apparatus is described in Perry's Chemical Engineers Handbook, 4th Ed., 1963, 19–88, FIGS. 19–137. Alternatively separation may be by seting, precipitation, etc. Here the carbon rich microorganisms are separated (split, i.e. harvested and passed on) from the stream and if the desired extra cellular product is carbon rich, then this portion is further separated and recovered. Typical products are polysaccharides, polyhydroxybutyric acid, glycogen, etc.

In a continuous cycle, if carbon rich compounds such as above are desired, then approximately two-thirds of the cells are harvested.

In the event that the N station but not the C treating station is "live" or producing commercial compounds, then all the C rich cells are passed on the N treatment. These cells then go on stream to the nitrogen treating station 3 which provides an extra-cellular source of nitrogen. Conventional agitation means may be present. Where nitrogen rich products such as proteins and amino acids are the main extra cellular products desired, station 3, providing proliferation conditions, is where this reaction takes place. The source of nitrogen may be organic or inorganic, but inorganic amomnium salts, such as the sulfate, chloride, etc. are preferred, for cost reasons and to avoid possible interference. Operable organic sources of nitrogen include proteins, enzyme-digested proteins, amino acids, yeast extract, asparagine and urea.

From station 3 a second centrifuge system 4 separates the nitrogen rich microbial agent from the effluent. If the nitrogen treating station 3 is live, i.e. designed in this process to produce commercial nitrogen rich products, then further separation and recovery is made of such nitrogen rich products such as protein, amino acid, etc. by solvent extraction, ion exchange electrophoresis, etc. (not shown).

As was the case in the separating station 2, the enriched microbial agent coming from separating station 4 is split. If N enriched products are desired in the process about two-thirds of the cells are harvested. On the other hand, where the primary product is C-rich, all of the cells are passed on stream forward to the cell growth or C treating station.

The balance of the split enriched microbial agent from the separating station 4 not harvested may be recombined with the effluent from separation station 4 containing intermediates, aqueous or solvent remainders, and returned in a continuous manner to the subsequent carbon treating station 1 where C-compounds are again accumulated.

Thus, a portion or all of the cells richest in N after separation at centrifuge 4, are returned to the carbon treating station 1, enhancing a continuous or cyclical source of microbial agent after provision for the initial start-up or seed.

In general, after each primary treating station, i.e. for C and N, a separation station (e.g. centrifuge) separates the microbial agent (cells). Where the treatment station is live the microbial agent is split and a portion of the cells is forwarded downstream to the succeeding treating station. If carbon rich or nitrogen rich compounds are desired at this preceding treating station, then about two-thirds of the total microbial agent recovered is harvested. On the other hand, where the treating station is inactive for the required C or N product, then all of the microbial agent is forwarded downstream to the treatment station for the other (N or C) treating station.

In any case, the remainder of the cells or microbial agent recovered at the particular separating station is passed along to the next or subsequent treating station. For example, that portion of the cells from separation station 2 designed for nitrogen treating station 3 may conveniently be recombined with some of the effluent from centrifuge 2. Where the treating station is "live," i.e. where the desired product is produced at the preceding treating station, then the recombination of the microbial agent with the effluent occurs after further recovery of the desired product by separatory measures such as ion exchange preferential solvent or electrophoresis methods (not shown).

Where the treatment station is "dead" or not producing cells or extra cellular commercial product, then no product separation occurs and recombination of the split microbial agent with some of the effluent from the centrifuge may occur on the stream 2–3.

Where the microbial agent or cells per se are the commercial product and the source of carbon and separate source of nitrogen are for substrate purposes only, then the desired carbon or nitrogen treatment station is considered "live." Thus, after contact with the carbon source the microbes will be high in carbon compounds, as polysaccharides, polyhydroxybutyric acid, glycogen, etc., but low in nitrogen material. Therefore, where these carbon compounds are desired, about two-thirds of the cells are harvested at the carbon separating station as product and recovered. The balance is sent forward to the nitrogen treating station.

Where cells high in nitrogenous material are required such as protein as product, then no harvesting occurs at the carbon separating station, but rather at the nitrogen separating station where about two-thirds of the nitrogen rich cells are harvested as products and the balance is sent forward to the carbon treating station.

Further, it is to be noted that a portion of the microbial agent from centrifuge 2 designed for nitrogen treatment station 3 may be passed directly to this subsequent nitrogen treating station without recombination with the effluent as where it is desired that all or a portion of the effluent containing intermediates etc. be discarded. The same observation is true of a split of the microbial agent after separation in nitrogen separating station 4, as in carbon separating station 2. The split portion of the microbial agent, in an appropriate case, may be passed directly to subsequent carbon treating station 1 without recombintion with the effluent from N separating station 4.

PROCESS MICROBIAL REACTANTS AND GENERAL

The metobolic basis or rationale behind the present continuous process has excited much intellectual curiosity in modern day industrial microbiology. For instance in D.J.D. Hockenhull "Progress in Industrial Microbiology," Vol. 1, "Microbiol Fat: Microorganisms as Potential Fat Producer," G.M. Woodbine, pages 179–245. At page 182 the author notes that "a high proportion of nitrogen to carbon tends to give an organism predominant in protein and a low nitrogen-carbon ratio tends to yield fat." Again Wilkinson J.F., speaking in the J. Gen. Microbial 11 p. 5972 (1954), when working with polysaccharides noted that the polysaccharide production as measured by the polysaccharide: nitrogen ratio was increased in all strains when growth was limited by a restricted supply of nitrogen source so that added carbohydrate remained in relative excess. The author was using *Aerobacter aerogenes*, and *E. coli*.

Although not limited to this particular field of interest, the present process is ideally suited for the treatment of petroleum hydrocarbons both as to processes involving the oxidation-reduction techniques and also as to the microbial fixation of nitrogen or anerobic conversion of $C_{1-30}$ hydrocarbons to proteins and amino acids. Other favorite processes include the microbiological production of citric acid, butyl alcohol, etc.

This process is preferably utilized in the dynamic phase since for modern day industrial economics that is preferable. However, it may also be utilized as a batch process with the two separate carbon and nitrogen treating chambers.

Cells can be harvested when the amount of desired compounds is highest and cellular contaminants from the medium lowest. Because the carbon or nitrogen source is used separately, a greater efficiency is obtained than if they were both used in the same medium. If carbon compounds are desired, much less nitrogen can be used than would be required in a normal medium. If nitrogen compounds are desired, a slightly less amount of carbon is required.

The microorganisms operable in the present invention depend upon the product envisioned. For example, where alkyl substituted cyclic hydrocarbons are oxidized, favorite microorganisms which may be employed by the practice of this invention include the Nocaridia Pseudomonas and Microbacteria (3,057,784 Davis et al.).

Again, where the product is protein in nature from the input petroleum, favorite microbiological agents operable include:

| | A.T.C.C. No. |
|---|---|
| *Pseudomonas ligustri* | 15,522 |
| *Pseudomonas pseudomallei* | 15,523 |
| *Pseudomonas orvilla* | 15,524 |
| *Alcalignes sp.* | 15,525 |
| *Cellumonas galba* | 15,526 |
| *Brevibacterium insectiphilium* | 15,528 |
| *Corynebacterium sp.* | 15,529 |
| *Corynebacterium pourometabolum* | 15,530 |

Again certain processes utilizing the present technique may simultaneously provide for the oxidation of hydrocarbon and production of protein where both C and N treatment stations are live or active.

The following examples illustrate but do not limit the facets of the persent invention which is a function only of the claims.

EXAMPLE 1

This example will be illustrative of the oxidation by Nocardia of n-butyl cyclohexene to produce cyclohexane acetic acid.

In a small pilot plant apparatus, a carbon treating station consisting of a fermentor with agitation and oxygen input equipment was prepared and a microbial agent consisting of a seed of 500 milligrams of Nocardio cells was added in 200 ml. $H_2O$ adjusted to pH $7.0 \mp 0.5$. An input of 2 moles of n-butyl cyclohexane was added to the mixture through an input valve and the reaction was incubated for about 100 hours at 30° C. As is conventional practice, small amounts of salts furnishing potassium, iron, calcium, magnesium, phosphate, sulfate and trace amounts of zinc, manganese, copper and molybdenum were added initially by commercial mixture. During the 100 hours reaction period the incubation mixture was drawn off continuously to a carbon separation station where a bowl type centrifuge separated out the microbial Nocardia. About ⅔ of the Nocardia microbial agent was harvested during the operation of the carbon treating station. Fractionation of the centrifuge effluent products revealed a yield of 0.701 mole of cyclohexane acetic acid or 35% total. Alternatively, the acid product may be separated by acidification and precipitation.

Approximately ⅓ of the carbon rich Nocardia from the centrifuge was recombined with the now product effluent from the factionation apparatus and passed through a nitrogen treating station physically similar to the carbon treating station but furnished with an extracellular source of nitrogen consisting of ammonium sulfate (1.0 gram/liter). The mixture was agitated and stirred under these proliferating conditions operated so that the hold on the N treating station averaged about 10 hours. The mixture was then passed to a separating station consisting of a centrifuge which removed the Nocardia microbial agent. It was recombined with some of the effluent from the centrifuge and passed forward to the carbon treating station, thus providing a high nitrogen microbial agent for continuous treatments. A portion of the effluent was recycled to N treating station. No commercial product was obtained in this case at the nitrogen treating station.

EXAMPLE 2

This example is illustrative of protein biosynthesis by securing production growth of microorganisms using inexpensive $C_1$–$C_{30}$ aliphatic hydrocarbon feeds. As is conventional practice, small amounts of salts furnishing potassium, iron, calcium, magnesium, phosphate, sulfate and trace amounts of zinc, manganese, copper and molybdenum were added by the commercial mixture buffered to a pH of about 7.2 in about 1000 ml. of $H_2O$. A microbial agent consisting of a seed of 500 milligrams of *Brevibacterium insestiphilium* (A.T.C.C. No. 15,528) was introduced. An input of 2 moles of N-hexadecane was added to the mixture through an input valve and the reaction was incubated for a total of about 90 hours at 30° C. for this run.

During the 90 hour reaction period, the incubation mixture was drawn off continuously to a carbon separation station where a bowl type centrifuge separated out the microbial agent.

All of the microbial agent from the separation centrifuge was recombined with some of the effluent product of the centrifuge and passed to a nitrogen treating station physically similar to the carbon treating station, but furnished with an extracellular source of nitrogen consisting of ammonium sulfate (200 mg/1 l.). The mixture was agitated and stirred under these proliferating conditions operated so that the whole or average time in the end treating station was about 10 hours. After this time interval was statisfied, the mixture was then passed to a separating station consisting of a centrifuge which removed the nitrogen rich *Brevibacterium insectiphilium* microbial agent. The microbial agent was split and about 60% was harvested as product and the remaining 40% was recombined with some of the effluent from the centrifuge and returned to the carbon treating station, thus providing nitrogen rich effluent and high nitrogen microbial agent for continuous treatment. In this case the product was in the microbial agent itself growing on the hydrocarbon feed in the carbon and proliferating in the nitrogen treating station.

The cell growth based upon the recovery in the centrifuging from the nitrogen treating station was about 100%. Yield 1020 mg. *Brevibacterium insectiphilium.*

The filtered cells can then be dewatered, e.g. using rotary drum driers, spray driers, etc. The cells are usually rendered non-viable before food use by spray drying at 150–185° C. for about 10–30 seconds. Care should be used in pasteurization to avoid extreme temperatures which tend to degrade the harvested cells by protein degradation. The cells may be used in making glues, adhesives, etc., or for their intracellular chemicals, e.g. amino acid content, and in these cases it is not necessary to make them non-viable.

Alternative sepaartion procedures for separting out the cells include isolation from the fermentation media, decantation, filtration (without or with filter aids), etc.

What is claimed is:
1. A continuous process for microbiological metabolism of a carbon source comprising metabolizing an initial source of carbon with a microorganism at a carbon treating station, taking off a resulting carbon rich effluent and passing said carbon rich effluent to a first separating station wherein the carbon rich microorganism is stripped from the carbon rich effluent, proportioning said carbon rich microorganism and harvesting a greater portion of said microorganism, and passing a portion of said stripped carbon rich effluent and a lesser portion of said carbon rich microorganism forward to a separate nitrogen treating station wherein nitrogen treatment is achieved under proliferating conditions with an exera-cellular source of nitrogen, taking off a resulting nitrogen rich effluent containin gnitrogen rich microorganism, and passing said nitrogen rich effluent to a second separating station wherein the nitrogen rich microorganism is stripped from the nitrogen rich effluent, and proportioning said nitrogen rich microorganism, harvesting a greater portion of said nitrogen rich microorganism and passing a portion of said stripped nitrogen rich effluent and a lesser portion of said nitrogen rich microorganism forward to the carbon treating station.

2. A process according to claim 1, wherein a carbon rich product is separated and recovered from a portion of said stripped carbon rich effluent from said first separating station.

3. A process according to claim 1, wherein a nitrogen rich product is separated and recovered from a portion of said stripped nitrogen rich effluent from said second separating station.

4. A process according to claim 1, wherein a carbon rich product is separated and recovered from a portion of said stripped carbon rich effluent from said first operating station and subsequently a nitrogen rich product is separated and recovered from a portion of said stripped nitrogen rich effluent from said second separating station.

5. A process according to claim 1, wherein the carbon rich microorganism is the desired product and is separated and harvested at the first separating station .

6. A process according to claim 1, wherein the nitrogen rich microorganism is the desired product and is separated and harvested at the second separating station.

7. A process according to claim 1, wherein a portion of the stripped effluent from a separating station is recycled to the previous treatment station.

8. A process according to claim 7, wherein a lesser portion of said microorganism is recycled to the previous treatment station.

9. A process according to claim 1, wherein said carbon rich microorganism is proportioned so that the entire quantity of said microorganism from the first separating station is passed forward to a separate nitrogen treating station.

10. A process according to claim 1, wherein said nitrogen rich microorganism is proportioned so that the entire quantity of said microorganism from the second separating station is passed forward to a separate carbon treating station.

References Cited

UNITED STATES PATENTS 3,015,612    1/1962    Pirt et al. _____ 195—142X

A. LOUIS MONACELL, Primary Examiner

S. RAND, Assistant Examiner

U.S. Cl. X.R.

195—31, 80, 82, 93, 94, 115